United States Patent
Meredith et al.

(10) Patent No.: US 11,381,484 B2
(45) Date of Patent: Jul. 5, 2022

(54) DYNAMICALLY REQUESTING MOBILE DEVICES TO REPORT NETWORK INFORMATION

(71) Applicant: AT&T Intellectual Property I, L.P., Atlanta, GA (US)

(72) Inventors: Sheldon Kent Meredith, Atlanta, GA (US); William Cottrill, Atlanta, GA (US); Biren Parekh, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 217 days.

(21) Appl. No.: 16/884,864

(22) Filed: May 27, 2020

(65) Prior Publication Data
US 2020/0287809 A1    Sep. 10, 2020

Related U.S. Application Data

(62) Division of application No. 16/520,663, filed on Jul. 24, 2019, now Pat. No. 10,693,752, and a division of
(Continued)

(51) Int. Cl.
*H04L 43/065* (2022.01)
*H04W 4/06* (2009.01)
(Continued)

(52) U.S. Cl.
CPC ............ *H04L 43/065* (2013.01); *H04L 43/08* (2013.01); *H04L 43/16* (2013.01); *H04W 4/06* (2013.01);
(Continued)

(58) Field of Classification Search
CPC ....... H04L 43/065; H04L 43/08; H04L 43/16; H04W 4/06; H04W 4/14; H04W 8/24; H04W 24/10
See application file for complete search history.

(56) References Cited

U.S. PATENT DOCUMENTS 6,078,572 A    6/2000 Tanno et al.
8,755,285 B2   6/2014 Zhang
(Continued)

OTHER PUBLICATIONS

U.S. Appl. No. 15/436,075, "Non-Final Office Action", dated Oct. 1, 2018, 17 pages.
(Continued)

*Primary Examiner* — Peter P Chau
(74) *Attorney, Agent, or Firm* — Amin, Turocy & Watson, LLP

(57) ABSTRACT

A mobile communications device may determine whether to report information regarding operation of the mobile device on a mobile network. The determination may be based on a reporting parameter set by a network control device and received via a broadcast message from a radio access node. The mobile device may compare the value of the reporting parameter to a randomly generated number. Based on the comparison, the mobile device may determine whether or not to provide information regarding operation of the mobile device or the radio access node to the network control device. The network control device may adjust the value of the reporting parameter to control the likelihood that a mobile device will report.

20 Claims, 10 Drawing Sheets

Related U.S. Application Data application No. 15/436,075, filed on Feb. 17, 2017, now Pat. No. 10,390,218.

(51) Int. Cl.
    *H04W 4/14*     (2009.01)
    *H04L 43/08*     (2022.01)
    *H04L 43/16*     (2022.01)
    *H04W 8/24*     (2009.01)
    *H04W 24/10*     (2009.01)

(52) U.S. Cl.
    CPC ............... *H04W 4/14* (2013.01); *H04W 8/24* (2013.01); *H04W 24/10* (2013.01)

(56) References Cited

U.S. PATENT DOCUMENTS

| | | | |
|---|---|---|---|
| 8,948,028 B2 | 2/2015 | Zhang et al. | |
| 8,948,063 B2 | 2/2015 | Aryan et al. | |
| 9,026,089 B2 | 5/2015 | Kauranen | |
| 9,119,106 B2 | 8/2015 | Tomala et al. | |
| 9,226,197 B2 | 12/2015 | Cui et al. | |
| 9,473,966 B2 | 10/2016 | Persson et al. | |
| 2008/0019307 A1* | 1/2008 | Tenny | H04W 72/005 370/329 |
| 2008/0207195 A1 | 8/2008 | Ranta et al. | |
| 2009/0066564 A1 | 3/2009 | Burroughs et al. | |
| 2010/0226263 A1 | 9/2010 | Chun et al. | |
| 2010/0325232 A1 | 12/2010 | Zhang et al. | |
| 2011/0045821 A1 | 2/2011 | Tyce et al. | |
| 2011/0190016 A1 | 8/2011 | Hamabe et al. | |
| 2011/0201279 A1 | 8/2011 | Suzuki et al. | |
| 2011/0286356 A1 | 11/2011 | Tenny et al. | |
| 2011/0287793 A1 | 11/2011 | Tenny et al. | |
| 2012/0106329 A1 | 5/2012 | Ahmed et al. | |
| 2012/0309292 A1 | 12/2012 | Sawai | |
| 2012/0309404 A1 | 12/2012 | Suzuki et al. | |
| 2012/0315890 A1 | 12/2012 | Suzuki et al. | |
| 2013/0010624 A1 | 1/2013 | He et al. | |
| 2013/0290230 A1 | 10/2013 | Bodog et al. | |
| 2014/0043973 A1 | 2/2014 | Groenendijk et al. | |
| 2014/0045500 A1 | 2/2014 | Dimou et al. | |
| 2015/0078171 A1 | 3/2015 | Gai et al. | |
| 2015/0230199 A1 | 8/2015 | Jeong et al. | |
| 2015/0237516 A1 | 8/2015 | Michel et al. | |
| 2016/0006553 A1 | 1/2016 | Kim et al. | |
| 2016/0080988 A1 | 3/2016 | Nagaraja et al. | |
| 2016/0227383 A1 | 8/2016 | Lin | |
| 2017/0013491 A1 | 1/2017 | Ma et al. | |
| 2017/0230804 A1 | 8/2017 | Weidenfeller | |

OTHER PUBLICATIONS

U.S. Appl. No. 15/436,075, "Notice of Allowance", dated Apr. 9, 2019, 9 pages.

U.S. Appl. No. 15/436,075, "Restriction Requirement", dated Jul. 26, 2018, 6 pages.

U.S. Appl. No. 16/520,663, "Notice of Allowance", dated Feb. 14, 2020, 11 pages.

* cited by examiner

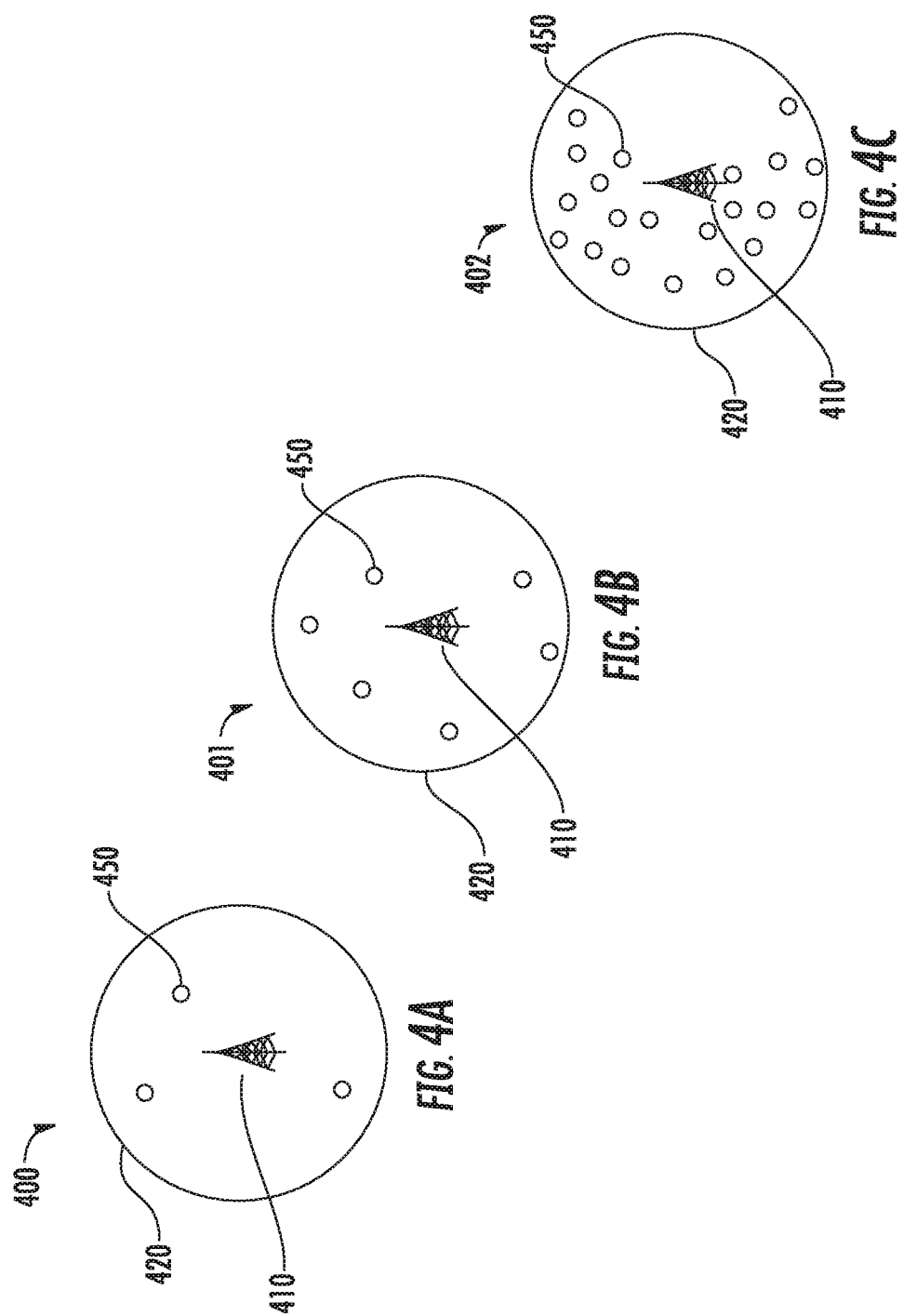

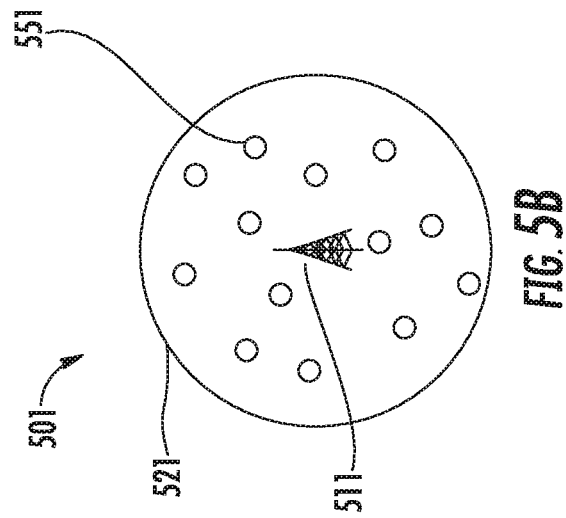
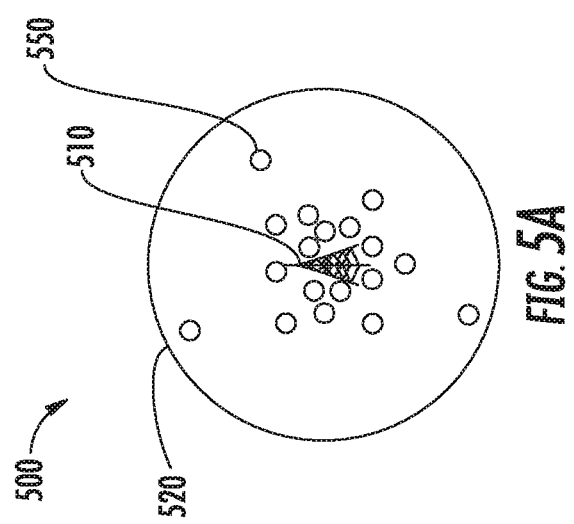

DYNAMICALLY REQUESTING MOBILE DEVICES TO REPORT NETWORK INFORMATION

RELATED APPLICATIONS

The present application is a divisional of U.S. application Ser. No. 16/520,663 for "Dynamically Requesting Mobile Devices to Report Network Information" filed Jul. 24, 2019, which is a divisional of U.S. application Ser. No. 15/436,075 for "Dynamically Requesting Mobile Devices to Report Network Information" filed Feb. 17, 2017, now issued as U.S. Pat. No. 10,390,218, all of which are incorporated by reference herein in their entirety.

FIELD OF THE INVENTION

This disclosure relates generally to the field of mobile network maintenance, and more specifically relates to systems and methods for dynamically requesting information from mobile devices to improve coverage determinations.

BACKGROUND

Operators of mobile networks, including networks that carry voice or data traffic related to mobile telephones or mobile computing devices, have a need to rapidly identify issues that affect the function of the mobile network. An issue that negatively affects the mobile network is network outage, such as a loss of coverage for an area of the mobile network. Loss of coverage can be caused by failure or poor functioning of a radio access node (also "radio," "node," or "RAN"), such as a radio that is providing coverage for an area of the mobile network. It is desirable for a mobile network operator to quickly detect issues on the mobile network and take corrective action, such as by dispatching technicians to fix a problem.

Current solutions for detecting issues include having radios report their current availability and loading, so the mobile network operator has information regarding which radios are up and running. In addition, mobile network operators may also use historical coverage information from radios to synthesize a coverage view of the network. For example, based on historical coverage information, a particular radio may provide coverage to a certain area. If the particular radio has a failure, the mobile network operator might infer that the area no longer has coverage. Alternatively, the mobile network operator might use historical coverage information from nearby radios to infer that the area has coverage, or partial coverage, from the nearby radios. If an issue affects only a single radio, the possibility of coverage or partial coverage can be assessed by looking at historical information of nearby cells to see if there is likely overlap in coverage.

However, if an issue affects multiple radios on a network, historical information regarding the affected radios may not provide an accurate estimation of their current coverage. For example, an ice storm may affect a large number of radios in an area. Some radios may cease functioning, and the mobile network operator may receive information regarding these failures. Other radios may continue functioning at a lesser level, such as if ice is covering antennae of the radios. The mobile network operator may receive information indicating that these radios are active, but may not receive information regarding the extent to which these radios are functioning or location information regarding the mobile devices served by these radios. The mobile network operator may have finite resources available to fix affected radios (e.g., limited number of technicians). It is desirable for the mobile network operator to have current information about radio functionality to generate an accurate coverage view and prioritize the order the radios should be fixed.

It is also desirable for a mobile network operator to receive current information from mobile devices and use it to determine coverage. It is further desirable for the mobile network operator to dynamically control the amount of information received from the mobile devices in order to balance the need for information with the impact of sending the information on the battery life of the mobile devices, the radio resources of the network, and the computing resources of the network.

SUMMARY

A mobile communications device (e.g., a mobile phone, a smart phone, tablet device, a wearable or embedded communications device) may determine whether to report information regarding network functionality. The mobile device may make this determination based on one or more parameters received from a radio access node. The information regarding network functionality may include information about the operation of the mobile device, or information about the radio access node, or other suitable information.

In one implementation, the mobile device may receive a reporting parameter from a radio access node. When a trigger event occurs on the mobile device, the mobile device may analyze the value of the reporting parameter to determine whether it has a predetermined value. When it has the predetermined value, the mobile device proceeds to process the trigger event. When it has a value other than the predetermined value, then in addition to processing the trigger event, the mobile device generates a random number and compares the randomly generated number to the value of the reporting parameter. When the comparison satisfies a predetermined relationship, such as the randomly generated number exceeds the value of the reporting parameter, then the mobile device generates a message to the network control device. The message includes information related to the operation of the mobile device. In some cases, determining whether or not to report information may be based on information about the mobile device, such as a battery level or a global positioning system (also, "GPS") signal strength.

In some systems, the value of the reporting parameter may be adjusted by a modifying factor. The modifying factor may increase the likelihood of reporting by mobile devices based on their distance from the radio access node.

These illustrative embodiments are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings.

FIGS. 4A-4C (collectively referred to as FIG. 4) are diagrams depicting exemplary reporting distributions based on reporting parameters having various values.

FIGS. 5A-5B (collectively referred to as FIG. 5) are diagrams depicting exemplary reporting distributions based on reporting parameters having various modifying factors.

DETAILED DESCRIPTION

The described implementations provide techniques for determining when a mobile device should report information describing functionality of a mobile network. The mobile network may include multiple radio access nodes and a network control device. The mobile device may access communication services via one or more of the radio access nodes. If one of the radios in the area of the mobile device is nonfunctional, the mobile device may establish communication with another of the radios in the area. The mobile device may provide information regarding the status of the mobile device, including information regarding its communications with radios. For example, the mobile device may report that communications with the first radio had been interrupted, and that the mobile device had a particular geographical location when the interruption occurred. In addition, the mobile device may report that communications with the second radio were established at another geographical location.

The mobile device may determine whether to report information based on a reporting parameter. For example, the mobile device may receive the reporting parameter in a broadcast message initiated by the network control device. When a trigger event occurs on the mobile device, the reporting parameter may be compared to a number randomly generated by the mobile device. The mobile device may report information when the random number exceeds the reporting parameter, or otherwise satisfies a criterion. Information reported by the mobile device may be received by the network control device. The network control device may correlate information received from multiple mobile devices, and determine functional conditions of the mobile network based on the correlated information, such as coverage areas.

Figure 1:
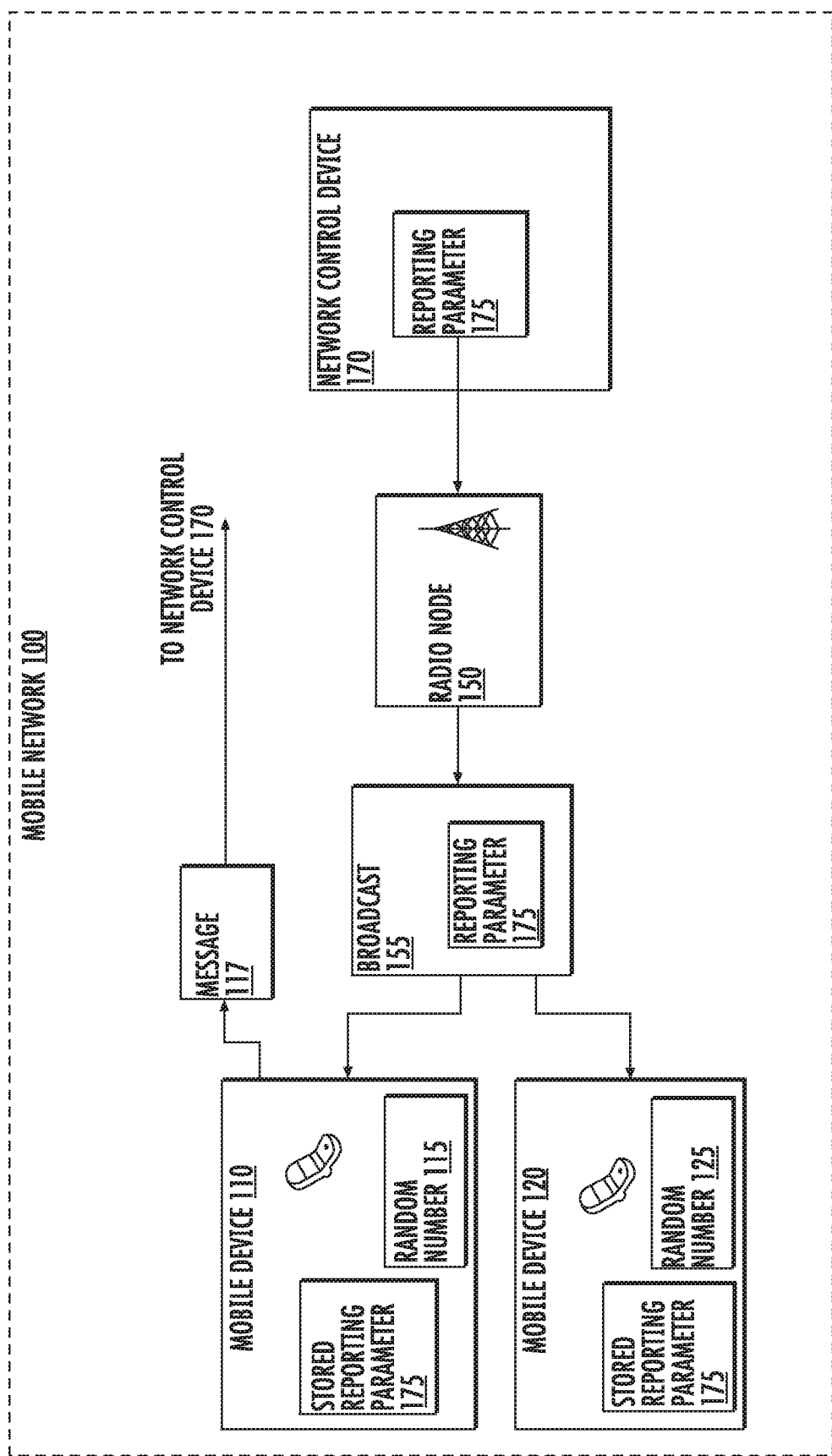
FIG. 1 is a diagram depicting an exemplary system capable of providing reporting parameters to mobile devices on a mobile network and receiving operation information from a portion of the mobile devices.

The following examples are provided to introduce certain embodiments of the present disclosure. Referring now to the drawings, FIG. 1 is a diagram depicting an exemplary system capable of providing reporting parameters to mobile devices on a mobile network and receiving operation information from a portion of the mobile devices. In one implementation, a mobile network 100 includes a mobile device 110, a mobile device 120, a radio 150, and a network control device 170. The mobile devices 110 and 120 each determine whether to report operating information to the network control device 170, based on a reporting parameter 175. For example, the network control device 170 may assign a value to the reporting parameter 175, and instruct the radio 150 to broadcast a message 155 including the reporting parameter 175 over a control channel of the mobile network 100. The mobile devices 110 and 120 may each receive the broadcast message 155 and later use the value of the reporting parameter 175 to determine whether or not to report information regarding its respective operation status. In some cases, the reporting parameter 175 or the broadcast message 155 may include additional information, such as a type of trigger event.

In some cases, mobile network 100 may use one or more control channels to provide information to mobile devices operating on the network. Each radio operating on mobile network 100 may use a respective control channel to broadcast information that is related to the respective radio, such as the radio's identification, location, technology type, or frequencies used to communicate with mobile devices. The radio 150 may use a control channel to broadcast a message 155 including the reporting parameter 175 to mobile devices 110 and 120. The value of the reporting parameter 175 may be particular to the radio 150, or may be the same as the values of additional radios in the mobile network 100. In some cases, the broadcast message 155 may include information in addition to the reporting parameter 175.

The mobile devices 110 and 120 may monitor one or more control channels to receive information from radios within communications range of the mobile device. A particular radio 150 may provide service to the mobile devices 110 and 120, such as by transmitting communications to and/or from the mobile devices. Each of mobile devices 110 and 120 may store the reporting parameter 175 received from radio 150, including the value of the reporting parameter. Each mobile device may update the value of the stored reporting parameter 175, such as based on receiving a modified reporting parameter from radio 150.

Each mobile device 110 or 120 may check the stored reporting parameter 175 based on the occurrence of a respective trigger event. A trigger event may include a communication session with the radio 150 that is initiated or received by the respective mobile device 110 or 120. The session may include an incoming or outgoing communication, such as a voice transmission, data transmission, message via short message service or multimedia message service (e.g., text message), an emergency alert message, or other communication types. In some cases, the type of trigger event may be predetermined, such based on as a setting of the respective mobile device 110 or 120. In addition, the trigger event may be based on an indication included in the broadcast message 155.

Each mobile device 110 or 120 may determine whether or not to report operation information in addition to processing the respective trigger event (e.g., placing phone call, receiving data transmission). In some cases, the mobile device 110 or 120 may generate a respective random number 115 or 125 and compare the generated random number to the value of the stored parameter 175. The random number may be generated based on limits (e.g., a random number between 0 and 1) related to the range of possible values of the reporting parameter. Based on the relationship between the random number and the stored parameter, the mobile device may generate a message including operation information, and transmit the message. In some cases, the message may be generated and transmitted if the stored value exceeds the random number, or is within a particular range of the random number, or any other relationship satisfying suitable predetermined criteria.

For example, mobile device 110 may generate a random number 115 and compare it to the value of the stored parameter 175. Based on a determination that the relationship between random number 115 and stored parameter 175 satisfies a first criteria, the mobile device 110 may generate a message 117 including operation information regarding mobile device 110, and transmit the message 115 to the network control device. In one implementation, the mobile device sends a message to an IP address for the network control device. The mobile device 110 may also process the respective trigger event. In addition, mobile device 120 may generate a random number 125 and compare it to the value of the stored parameter 175. Based on a determination that the relationship between random number 125 and stored parameter 175 does not satisfy the first criteria or that it satisfies a second criteria, the mobile device 120 may process the respective trigger event without generating a message including operation information regarding mobile device 120. The mobile devices 110 and 120 may each include a memory capable of storing computer-executable instructions, a processor capable of executing such instructions, and a transceiver capable of sending and/or receiving messages from radios, including broadcast messages and incoming/outgoing communications.

In some cases, the reporting parameter included in the broadcast message 155 may have a particular value (e.g., zero), and the mobile devices may process the trigger event without reporting information. For example, mobile devices 110 and 120 may not generate or compare the random numbers 115 and 125 with the stored parameter 175, based on the stored parameter having the particular value.

In some cases, the determination to report operation information may be further based on a status of the mobile device, such as a GPS signal strength, a battery level, a charging status (e.g., whether the mobile device is being charged), or other suitable device statuses. For example, based on the occurrence of the trigger event, each of mobile devices 110 and 120 may check its respective battery level and charging status. If the battery level is above a threshold capacity and/or the mobile device is charging, the mobile device 110 or 120 may perform additional operations related to reporting information, such as generating a random number or transmitting the message including operation information.

The mobile device may determine what operation information to report, such as a type or quantity of information. For example, the mobile device 110 may generate a message 117 including operation information. The generated message 117 may include indications regarding the device 110, such as a geographic location of the device 110, recent operations (e.g., transmissions, dropped calls), or an identification of the type of trigger event. In addition, the generated message 117 may include indications of components of the mobile network 100, such as identification of radio 150 or one or more additional radios that recently (or currently) have communicated with the device 110, a signal strength or relative location of the radios, a type of communication with the radios (e.g., voice sessions, data sessions), or a history of interactions between the mobile device 110 and the radios (e.g., dropped communications with a particular radio). In some cases, the type of information reported may be predetermined, such as based on a setting of the mobile device 110. In addition, the type of information reported may be based on an indication included in the broadcast message 155.

The generated message 117 may be transmitted to the network control device 170. In some cases, the mobile device 110 provides the message 117 via a radio with which the mobile device communicates. The radio transmitting the message 117 may be the same radio that broadcast the message 155. Alternatively, the radio transmitting the message may be a different radio, such as if the mobile device has commenced communications with a different radio subsequent to receiving the broadcast message. In one implementation, the mobile devices 110 and 120 may receive a second broadcast message that includes a second reporting parameter. The mobile devices 110 and 120 may each determine whether to report additional operation information based on a second value of the second reporting parameter.

Determining Mobile Network Conditions

Figure 2:
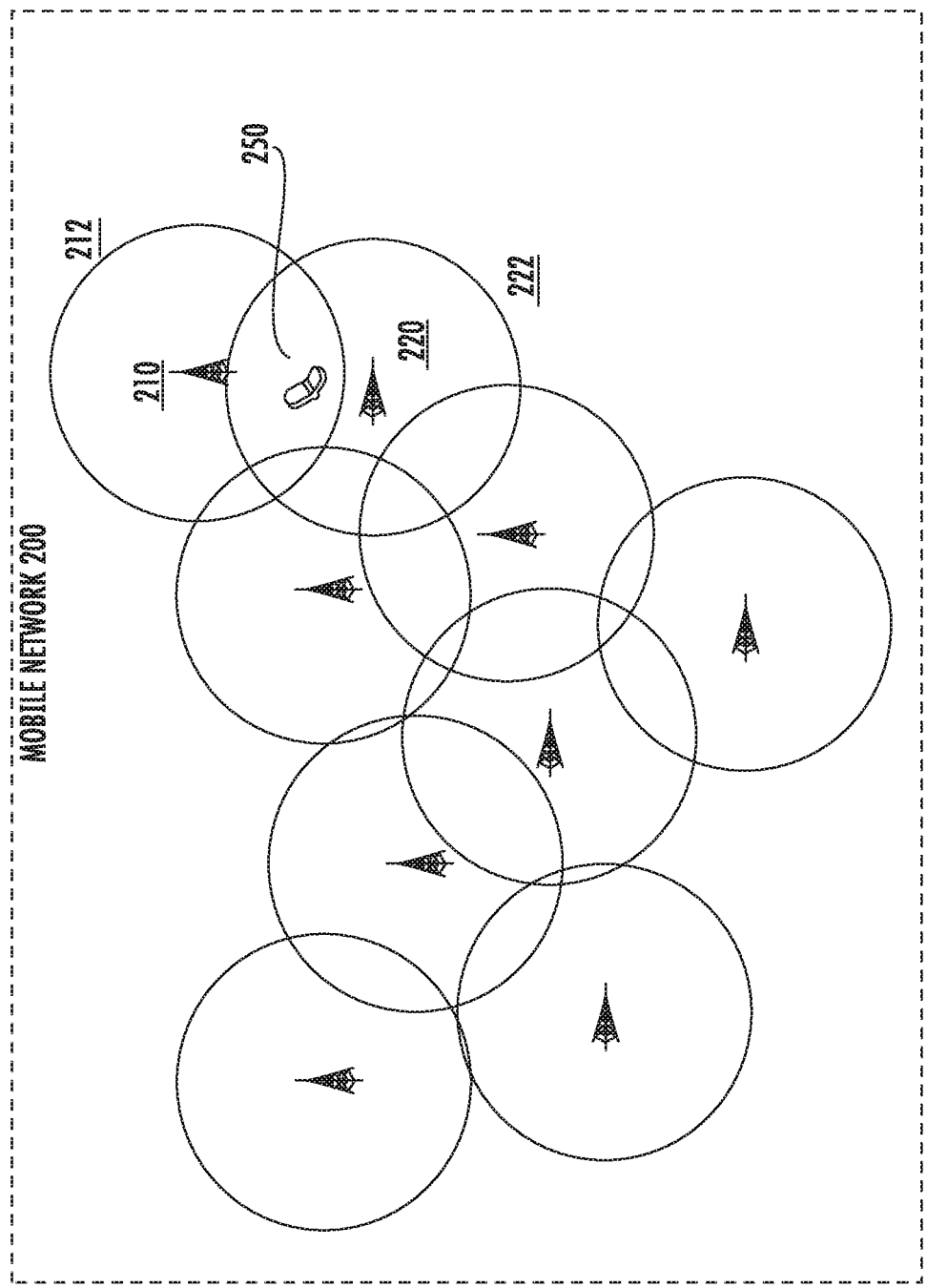
FIG. 2 is a diagram depicting an exemplary mobile network.

In some cases, conditions of a mobile network are based in part on operations of components included in the mobile network. FIG. 2 is a diagram depicting an exemplary mobile network 200. The mobile network 200 may include multiple radios, each radio having an area of coverage. For example, radio 210 may have an area of coverage 212. The area of coverage 212 may overlap with other coverage areas of other radios. The mobile network may include one or more mobile devices in communication with the radios. A mobile device, such as mobile device 250, may communicate with radio 210 to access a service (e.g., voice or data service).

FIG. 2 illustrates that some radios, e.g., radio 220, are no longer available. The coverage areas shown for the radios that are no longer available reflect the coverage areas for the radios when they were available. In some cases, a coverage area of a functioning radio may overlap with a coverage area of a nonfunctional radio. For example, radio 210 may have a coverage area 212 that overlaps with coverage area 222 of radio 220. Even though radio 220 is no longer available, other radios provide coverage for a portion of the coverage area 222 of radio 220. Thus, creating a coverage map based on an assumption that there is no coverage in the coverage area of an unavailable radio may not be accurate.

Figure 3A:
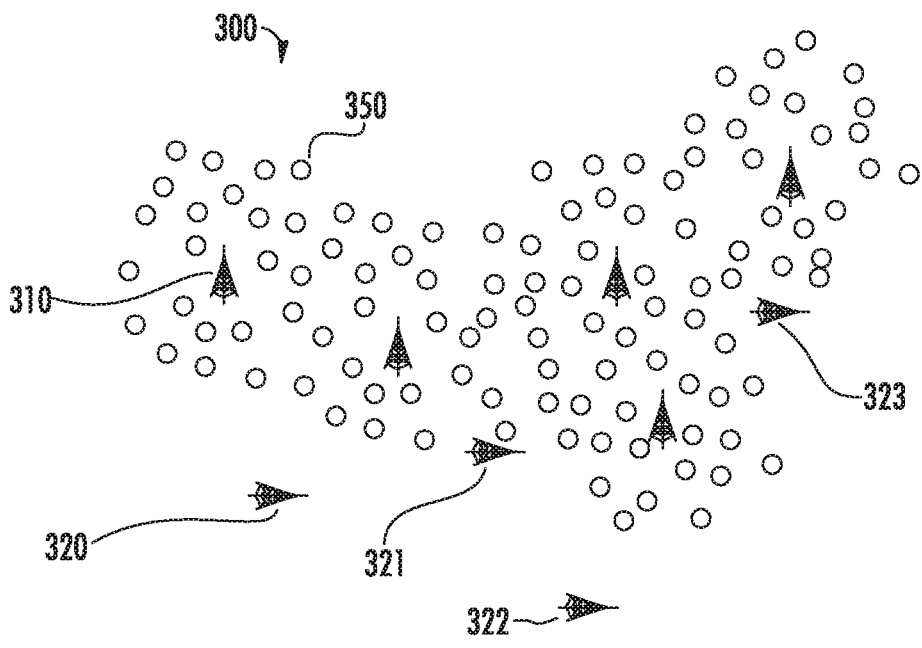
FIGS. 3A-3B (collectively referred to as FIG. 3) are diagrams depicting exemplary network conditions maps.
Figure 3B:
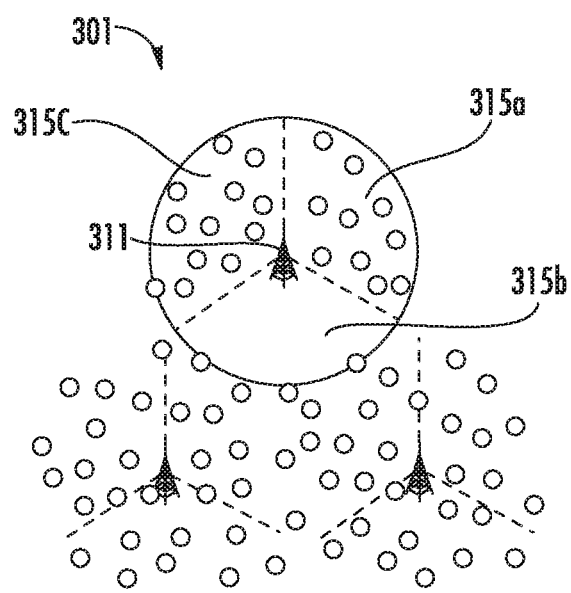

In one implementation, a network control device may determine mobile network conditions based on information received from both radios and mobile devices. FIGS. 3A-3B (collectively referred to as FIG. 3) are diagrams depicting exemplary network conditions maps. FIG. 3A depicts an example of a network conditions map 300. A network control device may construct or update the conditions map 300 based on received information describing the operation of mobile network components. For example, radios or mobile devices may provide operation information describing a current status, error conditions, current communication sessions (e.g., between mobile devices and radios), a device identifier, a device location, a volume of communication traffic, signal strength, data throughput rate, data quality, voice quality, data latency, or any other suitable information. The provided operation information may include historical conditions, such as error conditions detected during a period of time.

The network conditions map 300 may indicate current and/or historical operating conditions. For example, the conditions map 300 may indicate a status of one or more radios. A functioning radio may be represented by an icon, such as icon 310. A nonfunctioning radio may be represented by a different icon, such as one of icons 320, 321, 322, or 323. In addition, the conditions map 300 may indicate a location of a mobile device in communication with a radio. The location information may be provided by a mobile device based on a reporting parameter, as described in regards to FIG. 1. Locations of mobile devices may be represented by icons, such as by icon 350. The network control device may determine a coverage area of one or more radios, such as by correlating mobile device locations to the radio with which each device communicates. The coverage area (not shown in FIG. 3A) may be based on the current locations of mobile devices, or historical locations of mobile devices, or both.

In some cases, the conditions map 300 may indicate how recently information was received, such as by altering any of icons 310, 320, or 350 based on an elapsed time duration. In addition, radio coverage areas, error status, or communication sessions between radios and mobile devices may be represented, such as by icons, lines, or color coding. Other information may also be represented.

Based on the received information, the network control device may determine that the mobile network has normal or near normal operating conditions. For example, no more than a limited number of radios are unavailable. Alternatively, the network control device may determine that at least a portion of the mobile network has impaired operating conditions. For example, the network control device may receive information indicating that multiple radios 320, 321, 322 within proximity to one another are unavailable. In addition, the network control device may receive location information from some of the mobile devices that are communicating on the network, indicating coverage. The information may be used to prioritize radios for repair or maintenance. For example, for the conditions illustrated by FIG. 3A, some mobile devices located in the area of radios 321 and 323 may be able to communicate with the network, such as via nearby functioning radios. In addition, few mobile devices located in the area of radio 322 may be able to communicate with the network. Based on this information, the network control device may determine that radio 322 has a higher repair priority than radio 321 or radio 323. Once the network control device determines that there are portions of the mobile network with impaired operating conditions, it may adjust the value of the reporting parameter.

In some cases, a radio may include directional antennas. A coverage area of a radio may be served by a particular directional antenna of that radio. For example, FIG. 3B depicts an example of a network conditions map 301 representing operations of a radio, represented by icon 311, with directional antennae. The conditions map may represent coverage areas 315a, 315b, and 315c, associated respectively with each directional antennae. In some cases, the radio may be available, but an antenna on the radio may be nonfunctional or functional but providing poor coverage. For example, violent weather may cause ice or debris to obstruct the antenna. Although the radio may not report an error condition, the network conditions map 301 may indicate that the area typically covered by the antenna, e.g., coverage area 315b, is receiving poor service.

Although FIG. 3 depicts operations of a mobile network represented as a network conditions map, other representations or data structures may be used to indicate the mobile network operation conditions, including representations or data structures in a format not readable by humans.

In one implementation, the network control device may request information regarding network operating conditions, such as from mobile devices operating on the mobile network, to establish representation of network conditions. For example, the network control device may set a value of a reporting parameter to a first value. The first value may correspond to a relatively small number of mobile devices responding to the request (e.g., one out of 10,000 mobile devices communicating on a radio). The network control device may instruct one or more of the radios to broadcast the reporting parameter having the first value. Responsive to receiving instructions from the network control device, one or more of the radios may broadcast the reporting parameter having the first value.

In response to the broadcast reporting parameter, a first subset of mobile devices may provide operation information in a first group of messages, as described above. The quantity of mobile devices included in the first subset may be based on each mobile device comparing the reporting parameter to a random number, as described in regards to FIG. 1. The network control device may receive the first group of messages including mobile device information, such as via one or more radios.

The first group of messages may include location information for each mobile device in the first subset of mobile devices. Based on the location information in the received mobile device information, the network control device may determine or update operation information of the mobile network. In some cases, the network control device may define a particular coverage area based on the location information. For example, the coverage area may be correlated with one or more radios that are in communication with the first subset of mobile devices. In some cases, the coverage area is correlated with the determination that current network operations correspond to normal operations.

In one implementation, the network control device may receive updated operation information from components operating on the mobile network. For example, the network control device may receive radio operation information from a subset of the radios indicating that one or more radios in the subset is nonfunctional. In some cases, the subset of radios may include additional radios that are located near the nonfunctioning radio. Based on the updated operation information, the network control device may determine that the current network operations correspond to impaired operations.

The network control device may determine that additional information may provide a more accurate representation of network operations related to the subset of radios. The network control device may request additional information by adjusting the value of the reporting parameter to a second value. The second value may be selected to increase a number of mobile devices responding to the request (e.g., one out of 1,000 mobile devices communicating on a radio). The network control device may instruct one or more radios in the subset of radios to broadcast the adjusted reporting parameter. Responsive to receiving instructions from the network control device, the radios in the subset of radios may broadcast the adjusted reporting parameter having the second value. In some cases, the network control device may provide multiple adjusted reporting parameters with respective adjusted values, and instruct at least one radio in the subset to broadcast a respective one of the multiple adjusted reporting parameters.

In response to the broadcast of the adjusted reporting parameter, a second subset of mobile devices may provide operation information in a second group of messages, and the network control device may receive the second group of messages. The second group of messages may include location information for each mobile device in the second subset of mobile devices. Based on the location information in the received mobile device information, the network control device may define a revised coverage area. For example, the revised coverage area may be correlated with one or more radios that are in communication with the second subset of mobile devices. In addition, a radio correlated with the revised coverage area may have no communication, or limited communication, with mobile devices in the second subset (e.g., a nonfunctioning radio). In some cases, the revised coverage area is correlated with the determination that current network operations correspond to impaired operations.

Reporting Parameters and Modifying Factors

In one implementation, the value of the reporting parameter may be based on a probability. A higher probability may result in more mobile devices reporting operation information. A lower probability may result in fewer mobile devices reporting information. The number of mobile devices reporting may be determined in part based on the value of the reporting parameter. FIGS. 4A-4C (collectively referred to as FIG. 4) are diagrams depicting exemplary reporting distributions based on various values of reporting parameters. Each of FIGS. 4A-4C depict a radio, represented by icon 410, with a historical coverage area, represented by icon 420, and one or more mobile device locations, represented by icons such as icon 450. The radio 410 may broadcast various messages including various reporting parameters, and the distributions of mobile devices responding to the broadcasts may be used by a network control device to construct or update a network conditions map. For example, when a mobile network has normal operating conditions, it may be desirable for relatively few mobile devices to report information. Under normal operating conditions, the radio 410 may broadcast a first reporting parameter with a value based on a relatively low probability. FIG. 4A depicts an example network conditions map 400 based on a relatively low probability (e.g., probability of 0.0001). The first reporting parameter may result in relatively few mobile devices reporting information (e.g., one mobile device out of 10,000 mobile devices communicating on the mobile network). The current coverage area of the radio 410, represented by the mobile device locations 450, may inaccurately represent the historical coverage area 420. The network control device may balance the need for information describing the current coverage area against the normal operating conditions and available network resources.

In some cases, it may be desirable for increased accuracy regarding the current coverage area. The radio 410 may broadcast a second reporting parameter having a value based on an increased probability. FIG. 4B depicts an example network conditions map 401 based on an increased probability (e.g., probability of 0.01). The second reporting parameter may result in an increased number of mobile devices reporting information (e.g., one out of 100 mobile devices communicating on the network), and the received information may improve accuracy of the network operation conditions determined by the network control device. Based on the second reporting parameter, the mobile device locations 450 may represent the historical coverage area 420 with increased accuracy.

In some cases, the network control device may determine that a high level of accuracy regarding the current coverage area is desirable. For example, the radio 410 or additional nearby radios may report an error, or the network control device may base the determination on other received information (e.g., service complaints, reported violent weather). The radio 410 may broadcast a third reporting parameter having a value based on a relatively high probability. For example, FIG. 4C depicts an example network conditions map 402 that is updated based on an increased probability (e.g., probability of 0.2). The third reporting parameter may result in relatively many mobile device reporting information (e.g., one out of five mobile devices communicating on the network). Based on the increased amount of information received, the network control device may determine the current coverage area with a high level of accuracy, and may determine that no mobile devices are reporting information in certain areas of the historical coverage area 420.

Each mobile device may determine whether to report information based on a comparison of the reporting parameter value to a generated random number. In some cases, the comparison of the generated random number to the value of the stored reporting parameter is based on one or more modifying factors. Including a modifying factor in the comparison may allow consideration of the distance between the mobile device and the radio when determining whether to report. For example, communications between the mobile device and the radio may be based on a timing advance. The value of the timing advance may be used to determine a distance between the mobile device and the radio. For example, a timing advance with a value of 1 may correspond to a given distance between the radio and the mobile device. In addition, a timing advance with a value of 2 may correspond to twice the given distance. In some cases, the value of the given distance is dependent upon a technology used by the mobile network in which the radio and mobile device operate (e.g., mobile networks meeting the Global System for Mobile Communications ("GSM") standard or the Long-Term Evolution ("LTE") standard).

In addition, mobile devices in communication with a particular radio may be unevenly distributed within the coverage area of the particular radio. The mobile devices served by the particular radio may be more likely to be located near the radio's location. For example, the particular radio may be located near a population center, such that most mobile devices served by the radio are within the population center. A modifying factor based on distance may result in an increased likelihood of receiving information from mobile devices at greater distances from the particular radio.

In one implementation, a mobile device compares a generated random number to a modified value, such as a reporting parameter value that is multiplied by a value of a timing advance. The modified value may be determined by Equation 1, defined as:

$$RP*(TA/d) \qquad (Eq.\ 1)$$

For Equation 1, RP is the value of the reporting parameter, TA is the value of the timing advance related to communications between the radio and the mobile device, and d is a distance factor. The value of d may be based on the technology used by the mobile network in which the radio and mobile device operate. For example, a radio and a group of mobile devices may operate on a network where a timing advance of 1 corresponds to a distance of 100 m (e.g., mobile devices located 500 m from the radio will have timing advances of 5). The distance factor d may have a value of 10. The radio may broadcast a reporting parameter with a value of 0.1. A first mobile device located 1000 m from the radio may determine a first modified value as (0.1)*(10/10), and may compare a first random number (e.g., between 0 and 1) to the modified value of 0.1 (e.g., reporting occurs with a probability of 10%). A second mobile device located 500 m from the radio may determine a second modified value as (0.1)*(5/10), and may compare a second random number to the second modified value of 0.05 (e.g., reporting occurs with a probability of 5%). A third mobile device located 4000 m from the radio may determine a third modified value as (0.1)*(40/10), and may compare a third random number to the third modified value of 0.4 (e.g., reporting occurs with a probability of 40%). Mobile devices located farther from the radio may be more likely to report operating information.

In some cases, the decision to report based on a modifying factor including a distance multiplier may provide information from more mobile devices located in areas with a moderate concentration of mobile devices. For example, a radio may serve mobile devices where the majority of the mobile devices are located near the radio's location. FIG. 5A depicts an example network conditions map 500 of the radio's operation, based on comparing a generated random number to an unmodified reporting parameter value. The conditions map 500 may represent the radio by icon 510, a historical coverage area of the radio by icon 520, and mobile devices that have reported operation information by icons such as icon 550. A particular mobile device in communication with the radio may determine whether or not to report by comparing a generated random number to the value of the reporting parameter broadcast by the radio. Based on this type of comparison, conditions map 500 may provide a more accurate representation of network operations near the location of the radio because of the high concentration of mobile devices in proximity to the radio's location, but a less accurate representation of network operations near the edges of the radio's historical coverage area because of the low concentration of mobile devices located in that area. The lack of any reports from mobile devices in an area does not necessarily mean that there is no coverage in that area. It may mean that there are no reports because the number of mobile devices in the area is low and the value of the reporting parameter is set such that there is a low likelihood that the mobile devices will report.

FIG. 5B depicts an example network conditions map 501 of the radio's operation, based on comparing a generated random number to a reporting parameter value that is modified based on distance, such as by Equation 1. The conditions map 501 may represent the radio by icon 511, the historical coverage area by icon 521, and the mobile devices that have reported information by icons such as icon 551. A particular mobile device in communication with the radio may receive the reporting parameter broadcast by the radio, and store the value of the reporting parameter. The particular mobile device may modify the stored value based on the timing advance related to the communications between the radio and the mobile device. The particular mobile device may determine whether or not to report by comparing a generated random number to the modified value. Comparisons based on modified values may increase the likelihood that mobile devices having a higher timing advance (e.g., located farther from the radio) will report operation information. Based on this type of comparison, conditions map 501 may provide a representation of network operations with consistent accuracy over the radio's historical coverage area.

In one implementation, a mobile device compares a generated random number to a modified value, such as a reporting parameter value that is multiplied by a timing advance value having an exponent applied. The modified value may be determined by Equation 2, defined as:

$$RP*(TA/d r)^{(h)} \quad (Eq.\ 2)$$

For Equation 2, RP, TA, and d are defined as for Equation 1. The exponential factor (h) is a historical factor. The value of (h) may be based on a historical distribution of mobile devices within a coverage area of a radio. For example, a radio that covers a busy highway located in a sparsely populated area may serve mobile devices that are typically located close to the radio (e.g., on the highway). The radio and mobile devices may operate on a network where a timing advance of 1 corresponds to a distance of 100 m, and d may have a value of 10. The exponent (h) may have a value of 1.3 (e.g., historically, mobile devices are 130% more likely to be located within 1 km of the radio). The radio may broadcast a reporting parameter with a value of 0.1. A first mobile device located 1000 m from the radio may determine a first modified value as $(0.1)*(10/10)^{(1,3)}$, and may compare a first random number (e.g., between 0 and 1) to the modified value of 0.1 (e.g., reporting occurs with a probability of 10%). A second mobile device located 500 m from the radio may determine a second modified value as $(0.1)*(5/10)^{(1,3)}$, and may compare a second random number to the second modified value of about 0.04 (e.g., reporting occurs with a probability of about 4%). A third mobile device located 4000 m from the radio may determine a third modified value as $(0.1)*(40/10)^{(1,3)}$, and may compare a third random number to the third modified value of about 0.6 (e.g., reporting occurs with a probability of about 60%). Mobile devices located farther from the radio may be exponentially more likely to report operating information.

In some cases, the decision to report based on a modifying factor including an exponent may provide information from more mobile devices located in areas with a low concentration of mobile devices. For example, a radio may serve mobile devices where nearly all of the mobile devices are located near the radio's location. FIG. 6A depicts an example network conditions map 600 of the radio's operation, based on comparing a generated random number to an unmodified reporting parameter value. The conditions map 600 may represent the radio by icon 610, a historical coverage area of the radio by icon 620, and mobile devices that have reported operation information by icons such as icon 650. A particular mobile device in communication with the radio may determine whether or not to report by comparing a generated random number to the value of the reporting parameter broadcast by the radio. Based on this type of comparison, conditions map 600 may provide a more accurate representation of network operations near the location of the radio, but a less accurate representation of network operations near the edges of the radio's historical coverage area because of the low concentration of mobile devices located in that area.

Figure 6B:
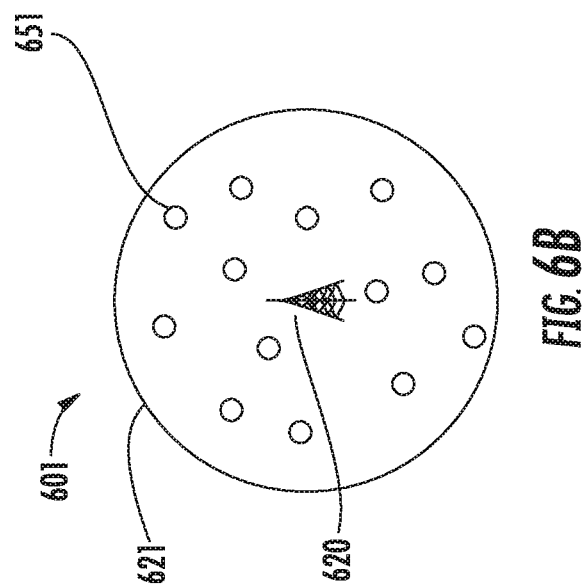
FIGS. 6A-6B (collectively referred to as FIG. 6) are diagrams depicting exemplary reporting distributions based on reporting parameters having various modifying factors.
Figure 6A:
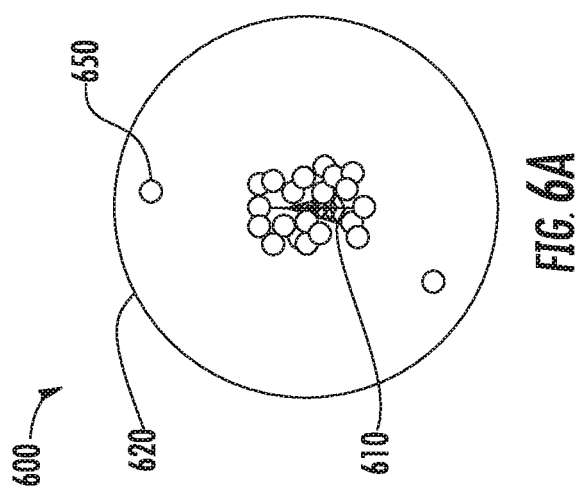

FIG. 6B depicts an example network conditions map 601 of the radio's operation, based on comparing a generated random number to a reporting parameter value that is modified based on distance, such as by Equation 2. The conditions map 601 may represent the radio by icon 611, the historical coverage area by icon 621, and the mobile devices that have reported information by icons such as icon 651. A particular mobile device in communication with the radio may receive the reporting parameter broadcast by the radio, and store the value of the reporting parameter. The particular mobile device may modify the stored value based on the timing advance of the mobile device and an exponent based on a historical distribution of mobile devices within the radio's historical coverage area. The particular mobile device may determine whether or not to report by comparing a generated random number to the modified value. Comparisons based on modified values including an exponent may increase the likelihood that mobile devices having a higher timing advance (e.g., located farther from the radio)

will report operation information. Based on this type of comparison, conditions map 601 may provide a representation of network operations with consistent accuracy over the radio's coverage area.

In some cases, modifying factors, one or more components of modifying factors (e.g., values of d or h), or an indication of whether to modify the reporting parameter may be predetermined, such based on as a setting of the mobile device. In addition, modifying factors, components, or an indication of whether to modify the reporting parameter may be based on an indication included in a broadcast message. In some cases, a particular radio broadcasts a message that includes values or indications that are related to the particular radio (e.g., a value of h related to the radio's historical distribution).

Figure 7:
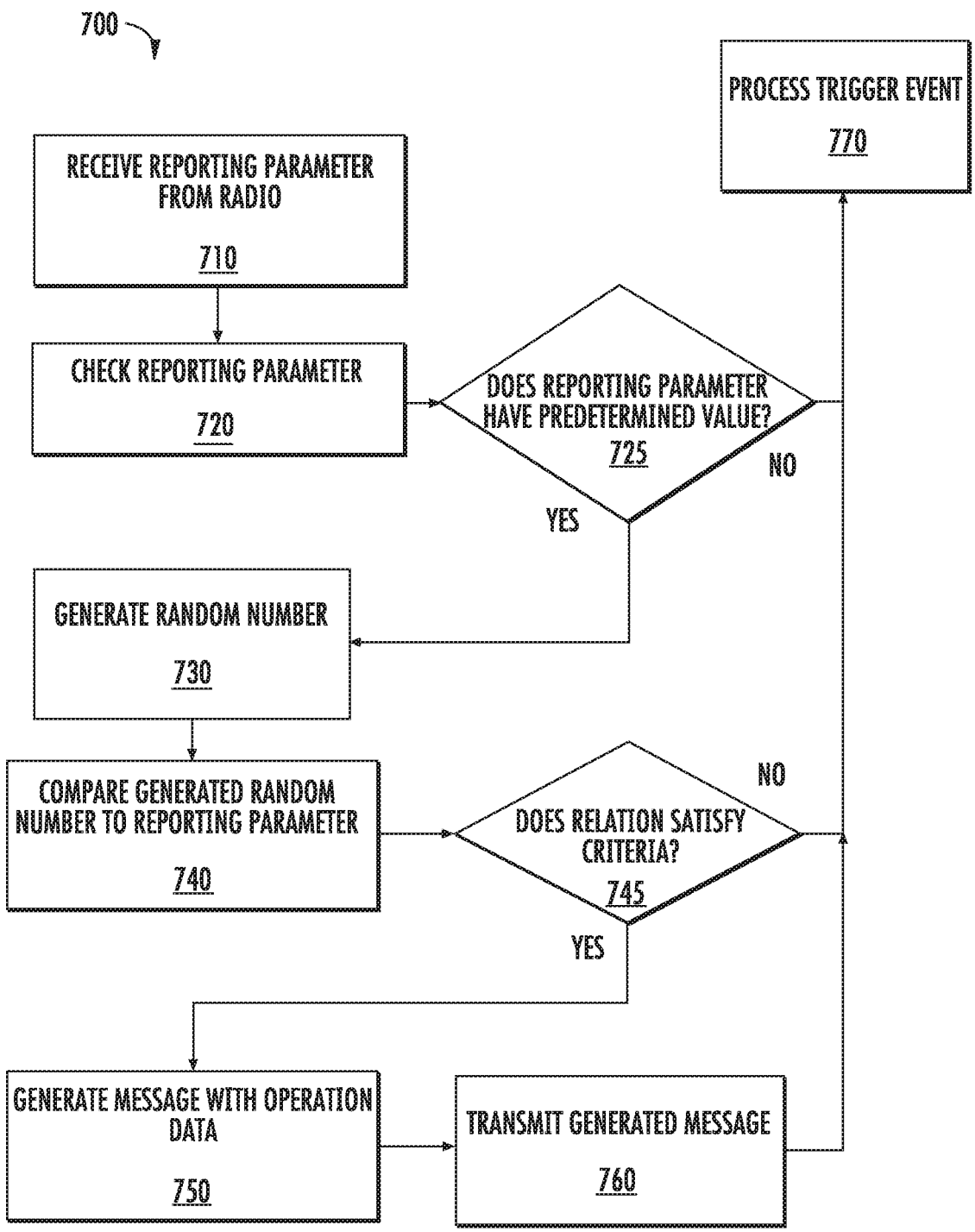
FIG. 7 is a flow chart depicting an exemplary process for determining whether or not to report information regarding mobile device operation.

FIG. 7 is a flow chart depicting an example of a process for determining whether or not to report information regarding mobile device operation. In some implementations, operations related to FIG. 7 may be performed by a mobile device communicating with a radio access node. For illustrative purposes, the process 700 is described with regards to the examples depicted in FIGS. 1-6.

At block 710, the mobile device may receive a reporting parameter from the radio. The reporting parameter may be broadcast by the radio via a control channel of the radio. The reporting parameter may include a value, or other indications.

At block 720, the mobile device may check the value of the reporting parameter. The value may be checked responsive to the occurrence of a trigger event, such as a request to place a voice call, or the receipt of a data transmission.

At block 725, the mobile device may determine whether the reporting parameter has a particular value (e.g., zero). Responsive to determining that the value of the reporting parameter is the particular value, process 700 may proceed to block 770 to process the trigger event. Responsive to determining that the reporting parameter has a value other than the particular value, process 700 may proceed to block 730.

At block 730, the mobile device may generate a random number. In some implementations, the random number may be generated according to one or more criteria, such as within a range of 0 to 1 (inclusive).

At block 740, the mobile device may compare the generated random number to the value of the reporting parameter. In some implementations, the value may be modified based on one or more modifying factors prior to the comparison. A relationship between the random number and the value (e.g., the reporting parameter value or the modified value) may be determined based on the comparison.

At block 745, the mobile device may determine whether the relationship between the random number and the value satisfies predetermined criteria. For example, the mobile device may determine that the random number exceeds the value, or is within a particular range of the value. Responsive to determining that the relationship satisfies the predetermined criteria, process 700 may proceed to block 750. Responsive to determining that the relationship does not satisfy the predetermined criteria, process 700 may proceed to block 770 to process the trigger event.

At block 750, the mobile device may generate a message including operation data. The included operation data may describe current operations of the mobile device or current operations of the radio as seen by the mobile device. In addition, the included operation data may describe historical operations of the mobile device or the radio, such as an indication of radios in recent communication with the device.

At block 760, the mobile device may transmit the generated message, such as to a network control device. The generated message may be transmitted via the radio that provided the reporting parameter, such as described in regards to block 710. Alternatively, the generated message may be transmitted via a different radio. For example, if the mobile device communicates with a different radio subsequent to receiving the reporting parameter, the generated message may be transmitted by that radio. In some cases, process 700 may proceed to other operations, such as operations related to block 770, after performing operations related to block 760. In addition, process 700 may proceed to other operations, such as a start point or an end point.

At block 770, the mobile device may process the trigger event. For example, the mobile device may place the voice call or continue to receive the data transmission. In some implementations, operations related to block 770 may be performed concurrently with other operations, such as operations related to one or more of blocks 725 or 750. In addition, process 700 may proceed to other operations, such as a start point or an end point, after performing operations related to block 770.

In some implementations, operations included in process 700 may be performed in conjunction with additional operations. For example, one or more operations included in process 700 may be performed responsive to determining a status of the mobile device, such as a battery level, charging status, or a GPS signal strength.

Figure 8:
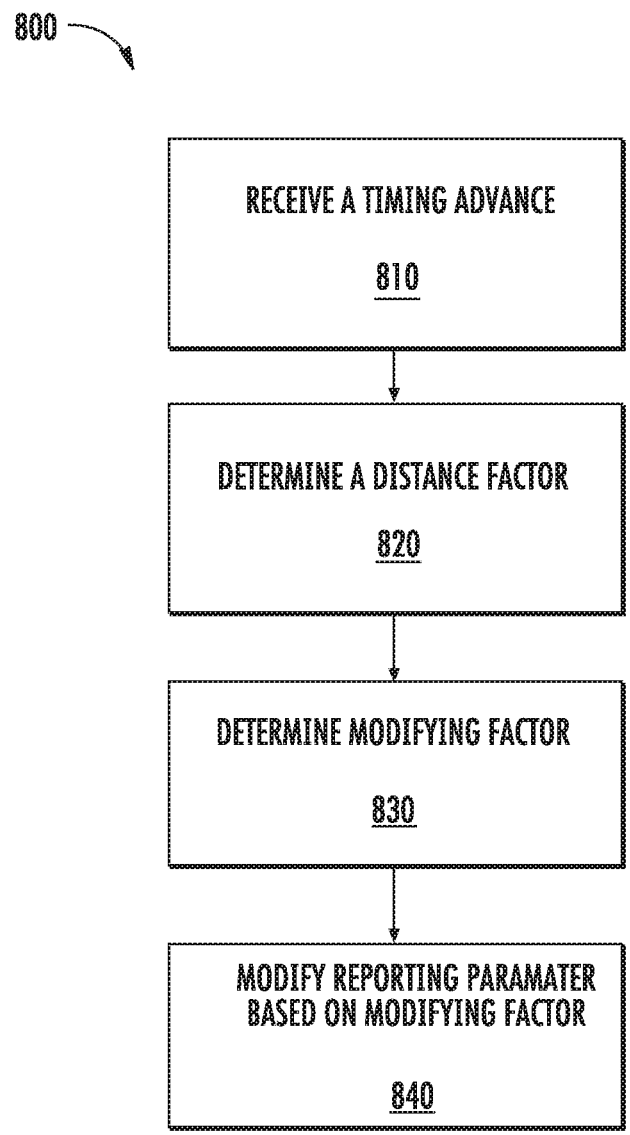
FIG. 8 is a flow chart depicting an exemplary process for determining a multiplicative modifying factor based on a timing advance.

FIG. 8 is a flow chart depicting an example of a process for determining a multiplicative modifying factor based on a timing advance. In some implementations, operations related to process 800 may be performed by a mobile device. For illustrative purposes, the process 800 is described with regards to the examples depicted in FIGS. 1-7.

At block 810, the mobile device may receive a timing advance related to a communication session with a radio. The timing advance may be received from the radio. In addition, the timing advance may be determined by the mobile device. In some implementations, the value of the timing advance may be dependent on one or more of the distance of the mobile device from the radio, or a mobile network technology (e.g., GSM, LTE) used by the mobile device and the radio.

At block 820, the mobile device may determine a distance factor. The distance factor may be based on the mobile network technology used by the mobile device and the radio. In some cases, the distance factor may be predetermined, such as based on a setting of the mobile device. In addition, the distance factor may be based on an indication included in a broadcast by the radio.

At block 830, the mobile device may determine the multiplicative modifying factor. For example, the modifying factor may be determined based on the timing advance divided by the distance factor.

At block 840, the mobile device may modify the value of a reporting parameter based on the determined modifying factor. For example, the modified value of the reporting parameter may be based on a multiplication with the determined modifying factor, such as described in regards to Equation 1. The modified value may be used in a comparison with a generated random number, such as described in regards to block 740 in FIG. 7.

In some implementations, operations included in process 800 may be performed in conjunction with other processes, such as operations related to one or more of blocks 740 or 745 in FIG. 7.

Figure 9:
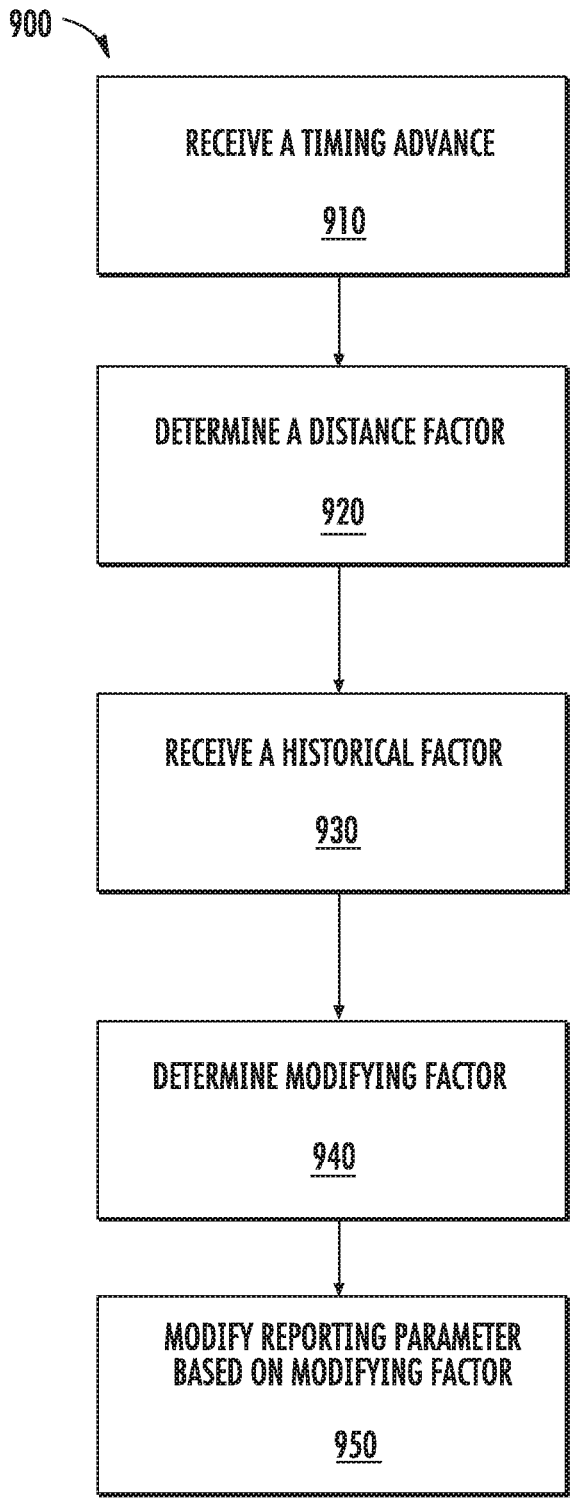
FIG. 9 is a flow chart depicting an exemplary process for determining an exponential modifying factor based on a timing advance and a historical distribution.

FIG. 9 is a flow chart depicting an example of a process for determining an exponential modifying factor based on a timing advance and a historical distribution. In some implementations, operations related to process 900 may be performed by a mobile device. For illustrative purposes, the process 900 is described with regards to the examples depicted in FIGS. 1-8.

At block 910, the mobile device may receive a timing advance related to a communication session with a radio. The timing advance may be received from the radio. In addition, the timing advance may be determined by the mobile device. In some implementations, the value of the timing advance may be dependent on one or more of the distance of the mobile device from the radio, or a mobile network technology (e.g., GSM, LTE) used by the mobile device and the radio.

At block 920, the mobile device may determine a distance factor. The distance factor may be based on the mobile network technology used by the mobile device and the radio. In some cases, the distance factor may be predetermined, such as based on a setting of the mobile device. In addition, the distance factor may be based on an indication included in a broadcast by the radio.

At block 930, the mobile device may receive a historical factor. The historical factor may be based on a historical distribution of mobile devices within a coverage area of the radio providing the timing advance. In some cases, the historical factor may be based on an indication included in a broadcast.

At block 940, the mobile device may determine the exponential modifying factor. For example, the modifying factor may be determined based on applying the historical factor as an exponent to the value of the timing advance divided by the distance factor.

At block 950, the mobile device may modify the value of a reporting parameter based on the determined modifying factor. For example, the modified value of the reporting parameter may be based on a multiplication with the determined modifying factor, such as described in regards to Equation 2. The modified value may be used in a comparison with a generated random number, such as described in regards to block 740 in FIG. 7.

In some implementations, operations included in process 900 may be performed in conjunction with other processes, such as operations related to one or more of blocks 740 or 745 in FIG. 7. In addition, operations included in process 900 may be performed in conjunction with operations described in relation to FIG. 8.

Figure 10:
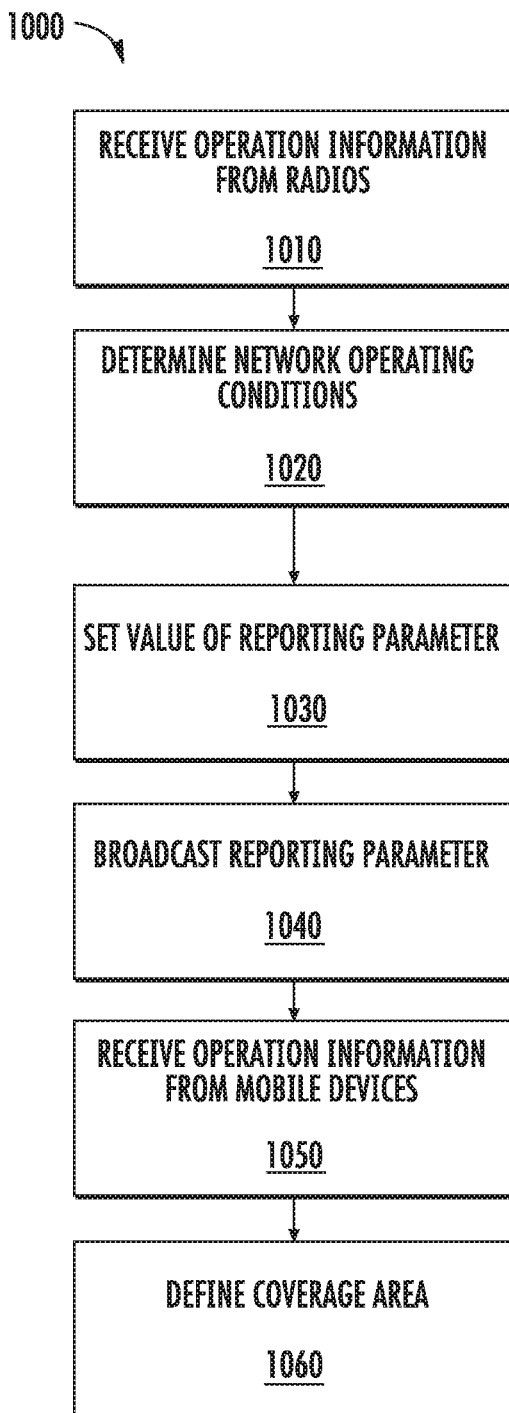
FIG. 10 is a flow chart depicting an exemplary process for determining mobile network operating conditions based on information received from radios and/or mobile devices included in the network.

FIG. 10 is a flow chart depicting an example of a process for determining mobile network operating conditions based on information received from radios and/or mobile devices included in the network. In some implementations, operations related to FIG. 10 may be performed by a network control device communicating with one or more radio access nodes and mobile devices. For illustrative purposes, the process 1000 is described with regards to the examples depicted in FIGS. 1-9.

At block 1010, the network control device may receive operation information from one or more radios included in the mobile network. For example, the received information may indicate availability of the one or more radios. In some cases, the received information may indicate updated operation information.

At block 1020, the network control device may determine current operating conditions of the mobile network, based on the received operation information. In some cases, the current operation conditions correspond to normal operations, such as if the received information indicates good network conditions (e.g., all or nearly all radios report full functionality). In some cases, the current operations correspond to impaired operations, such as if the received information indicates poor network conditions (e.g., some radios report error conditions or nonfunctionality).

The network control device may request operating information from multiple mobile devices in communication with the radios. At block 1030, the network control device may set a value of a reporting parameter. The reporting parameter may be set to a first value, such as a value selected so that relatively few mobile devices report (e.g., one out of 10,000 mobile devices). The first value may correspond to normal operations of the mobile network. In addition, the reporting parameter may be set to a second value selected to increase the likelihood that a mobile device reports so that more mobile devices communicating on the mobile network report (e.g., one out of 100 mobile devices). The second value may correspond to impaired operations of the mobile network. In some cases, the network control device may set multiple values for multiple respective reporting parameters.

At block 1040, the reporting parameter may be broadcast by one or more radios. For example, the network control device may provide instructions to a radio to broadcast the reporting parameter using the control channel of the radio. In some cases, the network control device may provide multiple groups of radios with respective instructions. For example, a first group of radios may receive instructions to broadcast a reporting parameter having the first value, and a second group of radios may receive instructions to broadcast a reporting parameter having the second value.

At block 1050, the network control device may receive operation information from one or more mobile devices communicating on the mobile network. For example, a subset of the mobile devices may respond to the request for information based on the broadcast reporting parameter. The operation information may be included in a message provided by each mobile device in the subset. In addition, each message may include location information of the respective mobile device. In some cases, a first subset of mobile devices may respond based on the reporting parameter having the first value, and a second subset of mobile devices may respond based on the reporting parameter having the second value.

At block 1060, the network control device may define a coverage area. In some cases, the coverage area may be defined based on the location information provided by the subset of mobile devices. In addition, the coverage area may be defined based on the availability information regarding the radios. In some cases, the coverage area is revised based on the mobile device operation information and the radio operation information.

In one implementation, operations related to process 1000 are repeated. For example, if current operating conditions of the mobile network are normal, the network control device may repeat operations related to one or more of blocks 1010 and 1020, such as until a determination is made to request more information. The determination to request information may be based on a received indication, such as an indication received from a user interface or an indication of an elapsed period of time since a previous request for more information. In addition, the determination to request information may be based on determining a change in the current operating condition of the mobile network.

In addition, the network control device may repeat operations related to one or more of blocks 1030, 1040, 1050, and 1060. For example, if the current operating conditions of the mobile network correspond to normal conditions, the network control device may set the reporting parameter to the first value. In addition, if the current network conditions correspond to impaired conditions, the network control device may adjust the reporting parameter to the second value. The adjusted reporting parameter may be broadcast by a subset of the radios on the mobile network. For example, if the network control device receives operation information indicating that a radio is nonfunctional, an adjusted reporting parameter may be broadcast to a subset of radios including the nonfunctional radio and one or more nearby radios. In some cases, the coverage area is revised based on mobile device information based on the adjusted reporting parameter.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The implementations described herein are examples, and the features of different implementations may be combined to achieve many different techniques, without departing from the described invention. For all of the provided examples and figures, the values and ranges are exemplary only, and may be changed without departing from the scope of the invention. The depicted and described services, attributes, and values are exemplary, and different characteristics may be used without departing from the described invention.

The foregoing descriptions and examples are provided for purposes of illustrating, explaining, and describing aspects of the present invention. Further modifications and adaptations to these examples will be apparent to those skilled in the art and may be made without departing from the scope of the invention. The exemplary systems and methods represented here may be implemented independently, in conjunction with a different one of the systems described, or in conjunction with a system not described herein. In some implementations, one or more of the techniques described herein may be performed on a mobile device based on an agreement, by a user of the device, to allow performance of the technique for a certain purpose (e.g., "opt-in" agreement). The agreement may be requested based on regulatory requirements in the user's region.

What is claimed is:

1. A method for reporting by a mobile device, comprising:
   receiving a broadcast message that includes a first reporting parameter having a first value;
   upon initiation of a first communication event of the mobile device, checking the first reporting parameter;
   based on the first reporting parameter having the first value, completing the first communication event;
   receiving a second broadcast message that includes a second reporting parameter having a second value;
   upon initiation of a second communication event of the mobile device, checking the second reporting parameter;
   based on the second reporting parameter having a value other than the first value:
      applying a modifier based on a distance between the mobile device and a radio access node in communication with the mobile device to the second value to obtain a modified value,
      generating a random number,
      comparing the random number and the modified value,
      when the comparing the random number and the modified value indicates that a relationship between the random number and the modified value satisfies a predetermined criterion, generating a message that includes information related to an operation of the mobile device and transmitting the message to a network control device; and
   completing the second communication event.

2. The method of claim 1, wherein the information related to the operation of the mobile device includes at least one of: a geographic location of the mobile device, a history of recent operations of the mobile device, or a signal strength of the radio access node.

3. The method of claim 1, further comprising: prior to generating the message that includes the information related to the operation of the mobile device, confirming one or more of the following: a global positioning system (GPS) signal strength of the mobile device satisfies a signal strength threshold, a charging status of the mobile device indicates that the mobile device is charging, or a battery level of the mobile device satisfies a battery threshold.

4. The method of claim 1, wherein the first communication event corresponds to one or more of: a voice call, a data transmission, a message via a short message service, or a message via a multimedia message service.

5. The method of claim 1, wherein a type of the first communication event is specified in the broadcast message.

6. The method of claim 1, wherein the distance between the mobile device and the radio access node is based on a timing advance.

7. The method of claim 6, wherein the timing advance indicates the distance between the mobile device and the radio access node, and
wherein applying the modifier based on the distance increases a likelihood that the modified value satisfies the predetermined criterion when the mobile device is located farther from the radio access node.

8. The method of claim 1, wherein the relationship between the random number and the modified value is more likely to satisfy the predetermined criterion as the distance between the mobile device and the radio access node increases.

9. The method of claim 1, wherein the second broadcast message includes a definition of the modifier.

10. The method of claim 1, wherein the information related to the operation of the mobile device is determined based on one or more of the broadcast message or the first communication event.

11. A mobile device, comprising:
a transceiver for sending and receiving messages via a radio access node;
a memory for storing computer-executable instructions; and
a processor for executing the computer-executable instructions stored in the memory to configure the mobile device to:
receive a broadcast message that includes a first reporting parameter having a first value;
upon initiation of a first communication event of the mobile device, check the first reporting parameter;
based on the first reporting parameter having the first value, complete the first communication event;
receive a second broadcast message that includes a second reporting parameter having a second value;
upon initiation of a second communication event of the mobile device, check the second reporting parameter;
based on the second reporting parameter having a value other than the first value:
apply a modifier based on a distance between the mobile device and a radio access node in communication with the mobile device to the second value to obtain a modified value,
generate a random number,
compare the random number and the modified value,
when the comparing the random number and the modified value indicates that a relationship between the random number and the modified value satisfies a predetermined criterion, generate a message that includes information related to an operation of the mobile device and transmitting the message to a network control device; and
complete the second communication event.

12. The mobile device of claim 11, wherein the information related to the operation of the mobile device includes at least one of: a geographic location of the mobile device, a history of recent operations of the mobile device, or a signal strength of the radio access node.

13. The mobile device of claim 11, wherein the processor executes the computer-executable instructions to further configure the mobile device to:
prior to generating the message that includes the information related to the operation of the mobile device, confirm one or more of the following: a global positioning system (GPS) signal strength of the mobile device satisfies a signal strength threshold, a charging status of the mobile device indicates that the mobile device is charging, or a battery level of the mobile device satisfies a battery threshold.

14. The mobile device of claim 11, wherein the first communication event corresponds to one or more of: a voice call, a data transmission, a message via a short message service, or a message via a multimedia message service.

15. The mobile device of claim 11, wherein a type of the first communication event is specified in the broadcast message.

16. The mobile device of claim 11, wherein the distance between the mobile device and the radio access node is based on a timing advance.

17. The mobile device of claim 16, wherein the timing advance indicates the distance between the mobile device and the radio access node, and
wherein applying the modifier based on the distance increases a likelihood that the modified value satisfies the predetermined criterion when the mobile device is located farther from the radio access node.

18. The mobile device of claim 11, wherein the relationship between the random number and the modified value is more likely to satisfy the predetermined criterion as the distance between the mobile device and the radio access node increases.

19. The mobile device of claim 11, wherein the second broadcast message includes a definition of the modifier.

20. The mobile device of claim 11, wherein the information related to the operation of the mobile device is determined based on one or more of the broadcast message or the first communication event.

* * * * *